United States Patent
Carvalho et al.

(10) Patent No.: US 10,860,952 B1
(45) Date of Patent: Dec. 8, 2020

(54) TABLE-DRIVEN DATA STORAGE SYSTEM FOR MULTI-DEPARTURE, MULTI-CABIN TRAVEL SEAT INVENTORY OPTIMIZATION

(71) Applicant: AMERICAN AIRLINES, INC., Fort Worth, TX (US)

(72) Inventors: Tassio Andrade Carvalho, Dallas, TX (US); Sudhakar Tumma, Southlake, TX (US); Soufiane Ahallal, Irving, TX (US); Yuxi Xiao, Irving, TX (US); Aurelien Vidal, Kirkland, WA (US)

(73) Assignee: American Airlines, Inc., Fort Worth, TX (US)

( * ) Notice: Subject to any disclaimer, the term of this patent is extended or adjusted under 35 U.S.C. 154(b) by 463 days.

(21) Appl. No.: 15/796,454

(22) Filed: Oct. 27, 2017

Related U.S. Application Data

(60) Provisional application No. 62/414,456, filed on Oct. 28, 2016.

(51) Int. Cl.
*G06Q 10/02* (2012.01)

(52) U.S. Cl.
CPC .................. *G06Q 10/02* (2013.01)

(58) Field of Classification Search
CPC ........ G06Q 10/02; G06Q 50/30; G06F 16/58; G06F 16/9537
See application file for complete search history.

(56) References Cited

U.S. PATENT DOCUMENTS

| | | | | |
|---|---|---|---|---|
| 5,255,184 | A * | 10/1993 | Hornick | G06Q 10/025 705/6 |
| 5,918,209 | A * | 6/1999 | Campbell | G06Q 10/02 705/5 |
| 6,974,079 | B1 * | 12/2005 | Strothmann | G06Q 10/02 235/380 |
| 7,212,978 | B2 * | 5/2007 | Kowal | G06Q 10/02 235/376 |
| 8,190,457 | B1 * | 5/2012 | Chandler | G06Q 10/02 705/5 |

(Continued)

OTHER PUBLICATIONS https://web.archive.org/web/20151128055955/http://www.mathworks.com/help/matlab/import_export/import-a-worksheet-or-range.html.*

(Continued)

*Primary Examiner* — Omar Zeroual
(74) *Attorney, Agent, or Firm* — Haynes and Boone, LLP

(57) ABSTRACT

A system and method that includes receiving for each passenger: a PNR; a passenger identification number ("PIN"); a passenger's historical itinerary; a fare; and an assigned seat. The method also includes assigning each PIN with a customer segment; storing the assignment within a first table; and then associating, using the first table and hierarchical rules stored within a second table, each PIN with a demand category. The method also includes identifying a product market; identifying a demand for the product market by each demand category; representing, using a utility function, the demand for the product market; and using the utility functions in a variable pricing strategy for the product market. The method also includes changing the hierarchical rules to alter the association between customer segments and demand categories without changing logic code, thereby increasing flexibility of the system.

20 Claims, 14 Drawing Sheets

(56) References Cited

U.S. PATENT DOCUMENTS

| | | | | |
|---|---|---|---|---|
| 8,738,544 B1* | 5/2014 | Mirza | G06Q 50/01 | 705/319 |
| 9,639,812 B1* | 5/2017 | Green | G06Q 10/025 | |
| 2002/0156659 A1* | 10/2002 | Walker | G06Q 20/00 | 705/5 |
| 2003/0115093 A1* | 6/2003 | Lim | G06Q 10/025 | 705/7.31 |
| 2005/0076124 A1* | 4/2005 | Enderlein | H04L 63/0407 | 709/227 |
| 2007/0143153 A1* | 6/2007 | Ashby | G06Q 10/02 | 705/5 |
| 2007/0244766 A1* | 10/2007 | Goel | G06Q 30/0613 | 705/5 |
| 2008/0052185 A1* | 2/2008 | Goel | G06Q 10/02 | 705/27.1 |
| 2009/0287518 A1* | 11/2009 | Marode | G06Q 30/0206 | 705/7.35 |
| 2012/0035965 A1* | 2/2012 | Maguire | G06Q 10/02 | 705/5 |
| 2012/0271679 A1* | 10/2012 | Schroder | G06Q 10/02 | 705/7.31 |
| 2013/0103434 A1* | 4/2013 | Cazeaux | G06Q 50/14 | 705/5 |
| 2014/0108067 A1* | 4/2014 | Gluhovsky | G06Q 30/0635 | 705/5 |
| 2014/0122173 A1* | 5/2014 | Wang | G06Q 30/0202 | 705/7.31 |
| 2014/0257900 A1* | 9/2014 | Jacobs | G06Q 10/063116 | 705/7.16 |
| 2014/0257925 A1* | 9/2014 | Tracy | G06Q 30/0202 | 705/7.31 |
| 2015/0154511 A1* | 6/2015 | Magnat | G06Q 10/02 | 705/5 |
| 2015/0237013 A1* | 8/2015 | Bansal | H04L 63/0263 | 726/13 |
| 2015/0348074 A1* | 12/2015 | Rangaswamy | G06Q 30/0204 | 705/7.33 |

OTHER PUBLICATIONS

Jayaswal, S. (2009). Product differentiation and operations strategy for price and time sensitive markets (Order No. NR55518). Available from ProQuest Dissertations and Theses Professional. (305147035). Retrieved from http://dialog.proquest.com/professional/docview/305147035?accountid=161862.*

Sachin Jayaswal, "Product Differentiation and Operations Strategy for Price and Time Sensitive Markets", published by The University of Waterloo, in 2009, all pages (Year: 2009).*

* cited by examiner

| PNR | Party ID | Pax Count | Pax ID | Origin | Dest | PNR Date | Dep Date | FLT# | Cabin |
|---|---|---|---|---|---|---|---|---|---|
| KDIENT | 1A17AKINFHR3 | 1 | A865729 | NRT | LAX | 20170803 | 20171015 | 170 | J |
| YFOENH | 3K17AKIXAHR4 | 3 | H7548339 | DFW | LHR | 20170915 | 20171024 | 50 | J |
|  |  |  | U7548930 | DFW | LHR | 20170915 | 20171024 | 50 | J |
|  |  |  | P7548939 | DFW | LHR | 20170915 | 20171024 | 50 | J |
| NGDTEJ | 1D17AKOHFH87 | 1 | W9847529 | GRU | MIA | 20171003 | 20171024 | 906 | J |

| PNR | Party ID | TKT Date | Coupon | Fare |
|---|---|---|---|---|
| KDIENT | 1A17AKINFHR3 | 20170822 | 001-90832447889 | $1,803 |
| YFOENH | 3K17AKIXAHR4 | N/A |  |  |
|  |  | N/A |  |  |
|  |  | N/A |  |  |
| NGDTEJ | 1D17AKOHFH87 | 20171003 | 001-90832443857 | $2,465 |

| PNR | Party ID | Pax Count | Pax ID | Origin | Dest | Seat |
|---|---|---|---|---|---|---|
| KDIENT | 1A17AKINFHR3 | | 1A865729 | NRT | LAX | 7L |
| YFOENH | N/A | | | | | |
| | | | | | | |
| NGDTEJ | N/A | | | | | |

| Pax ID | Segment | Premium Propensity | Upgrade Requests | Preferred Cabin |
|---|---|---|---|---|
| A865729 | Personal | Medium | 50% | J |
| H7548339 | Small Biz | High | 75% | W |
| U7548930 | | | | |
| P7548939 | | | | |
| W9847529 | Corporate | Always | | F |

| Rule priority | Rule | | | Category |
|---|---|---|---|---|
| 1 | Segment | = | Corporate | Contract |
| 2 | Premium Propensity | = | Always | Premium |

220a / 220b / 220c — 220

| PNR | Pax ID | Category |
|---|---|---|
| KDIENT | A865729 | Personal |
| YFOENH | H7548339 | Small Biz |
| | U7548930 | Small Biz |
| | P7548939 | Small Biz |
| NGDTEJ | W9847529 | Contract |
| JFIEMS | J9843726 | Contarct |
| NIEALE | W0457832 | Personal |
| | E01425784 | Personal |
| MSDUFK | Q09812734 | Contract |
| SGENSF | M89745323 | Upgrade |
| PMALKD | H9087434 | Contract |
| MUPSUE | H927456186 | Small Biz |
| | K80924732 | Personal |
| NVCTEI | W09827459 | Contract |
| AKDUEL | T89043232 | Redemption |
| MVYROI | B0982348902 | Contract |
| QVSREE | B089342983 | Upgrade |
| MCHULJ | E098374 | Contract |
| RUIUOI | R098437 | Redemption |
| | R843790 | Redemption |
| | R384790 | Redemption |
| | T980437 | Redemption |
| IUJRFE | B0897433 | Upgrade |
| UJINHR | B04392832 | Contract |
| IYHUGF | M0983725 | Premium |
| IOURFE | U098342 | Small Biz |

FIG. 12

| CABIN | FLIGHT 1 | | FLIGHT 2 | |
|---|---|---|---|---|
| | F | Y | F | Y |
| SEGMENT A | $U_{AF1}$ | $U_{AY1}$ | $U_{AF2}$ | $U_{AY2}$ |
| SEGMENT B | $U_{BF1}$ | $U_{BY1}$ | $U_{BF2}$ | $U_{BY2}$ |

FIG. 13

TABLE-DRIVEN DATA STORAGE SYSTEM FOR MULTI-DEPARTURE, MULTI-CABIN TRAVEL SEAT INVENTORY OPTIMIZATION

CROSS-REFERENCE TO RELATED APPLICATION

This application claims the benefit of the filing date of, and priority to, U.S. Application No. 62/414,456, filed Oct. 28, 2016, the entire disclosure of which are hereby incorporated herein by reference.

BACKGROUND

Seat inventory yield management systems are used in passenger transportation networks to determine how much to charge for seats that are available for sale. Airlines have large and complex yield management systems, and other modes of transportation, such as railroads, use systems with similar logic. Typically these systems segregate demand predictions by individual departure time in the schedule and further by travel class or cabin.

For air travel, existing technology links different cabins in the same flight by assuming that a subset of seats in a higher priced cabin (for example, First Class) can be offered for sale in a lower priced cabin (for example, Coach Class). The excess sales for the lower-priced cabin are usually resolved at departure by upgrading some passengers to the higher priced cabin. These methods are commonly known as Cabin Sharing or Cabin Borrowing. However, these methods always assume that a particular unit of demand can only be interested in purchasing products associated with a single cabin category of the aircraft. This assumption is problematic because in reality passenger demand makes trade-offs between price and product quality, selecting from a product set that can be from different cabins.

Moreover, additions to the premium product mix being offered by a commercial carrier often require extensive logic code rewrites/edits to correctly categorize and determine the demand of those additional premium products. For example, the fare classes for first class domestic often have F, A, P as fare codes, with F more expensive than A, and A more expensive than P fare classes. To change the hierarchy of the fare code pricing, extensive information technology (IT) rework is often required to the logic code that involves the hierarchal ranking of the fare codes, which IT rework increases the likelihood of inadvertent consequences and mistakes.

BRIEF DESCRIPTION OF THE DRAWINGS

FIG. 7 is a diagrammatic illustration of a table used by the system of FIG. 1 during the method of FIGS. 6A and 6B, according to an example embodiment.

FIG. 8 is a diagrammatic illustration of another table used by the system of FIG. 1 during the method of FIGS. 6A and 6B, according to an example embodiment.

FIG. 9 is a diagrammatic illustration of yet another table used by the system of FIG. 1 during the method of FIGS. 6A and 6B, according to an example embodiment.

FIG. 10 is a diagrammatic illustration of yet another table used by the system of FIG. 1 during the method of FIGS. 6A and 6B, according to an example embodiment.

FIG. 11 is a diagrammatic illustration of yet another table used by the system of FIG. 1 during the method of FIGS. 6A and 6B, according to an example embodiment.

FIG. 12 is a diagrammatic illustration of yet another table used by the system of FIG. 1 during the method of FIGS. 6A and 6B, according to an example embodiment.

FIG. 13 is a diagrammatic illustration of yet another table used by the system of FIG. 1 during the method of FIGS. 6A and 6B, according to an example embodiment.

DETAILED DESCRIPTION

Figure 1:
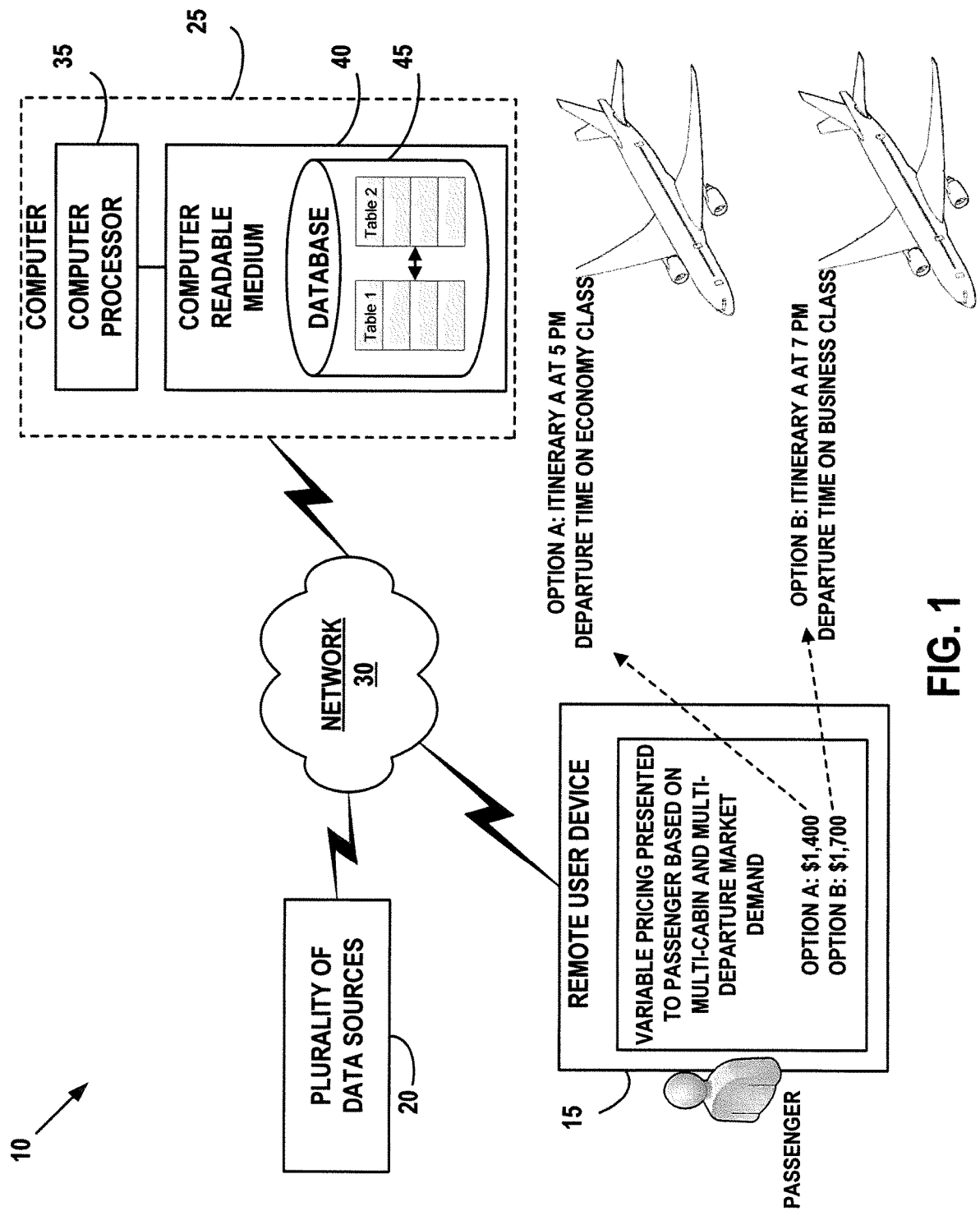
FIG. 1 is a diagrammatic illustration of a system according to an example embodiment, the system including a computer.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A system generally referred to by the reference numeral 10, as illustrated in FIG. 1, provides a table-driven data storage system that provides increased flexibility when determining the demand of a multi-cabin and multi-departure time travel market using customer segmentation and categorization. In an example embodiment and as illustrated in FIG. 1, the system 10 includes one or more remote user devices 15; a plurality of data sources 20; and a computer 25, which are operably coupled together, and in communication via a network 30. Generally, the computer 25 includes a computer processor 35 and a computer readable medium 40 operably coupled thereto. Instructions accessible to, and executable by, the computer processor 35 are stored on the computer readable medium 40. A database 45 is also stored in the computer readable medium 40.

Figure 2:
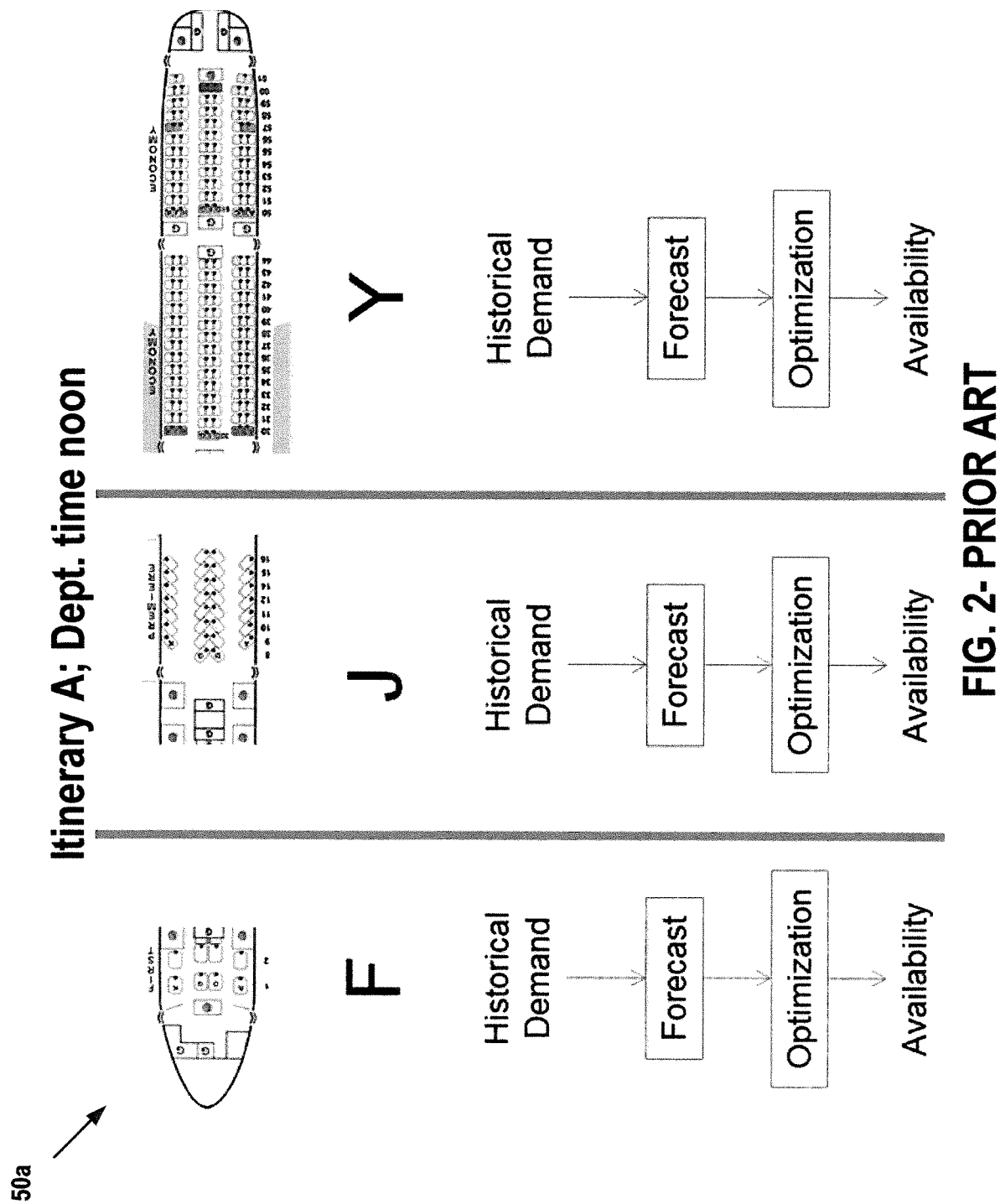
FIG. 2 is a diagrammatic illustration representing conventional methods of price optimization.
Figure 3:
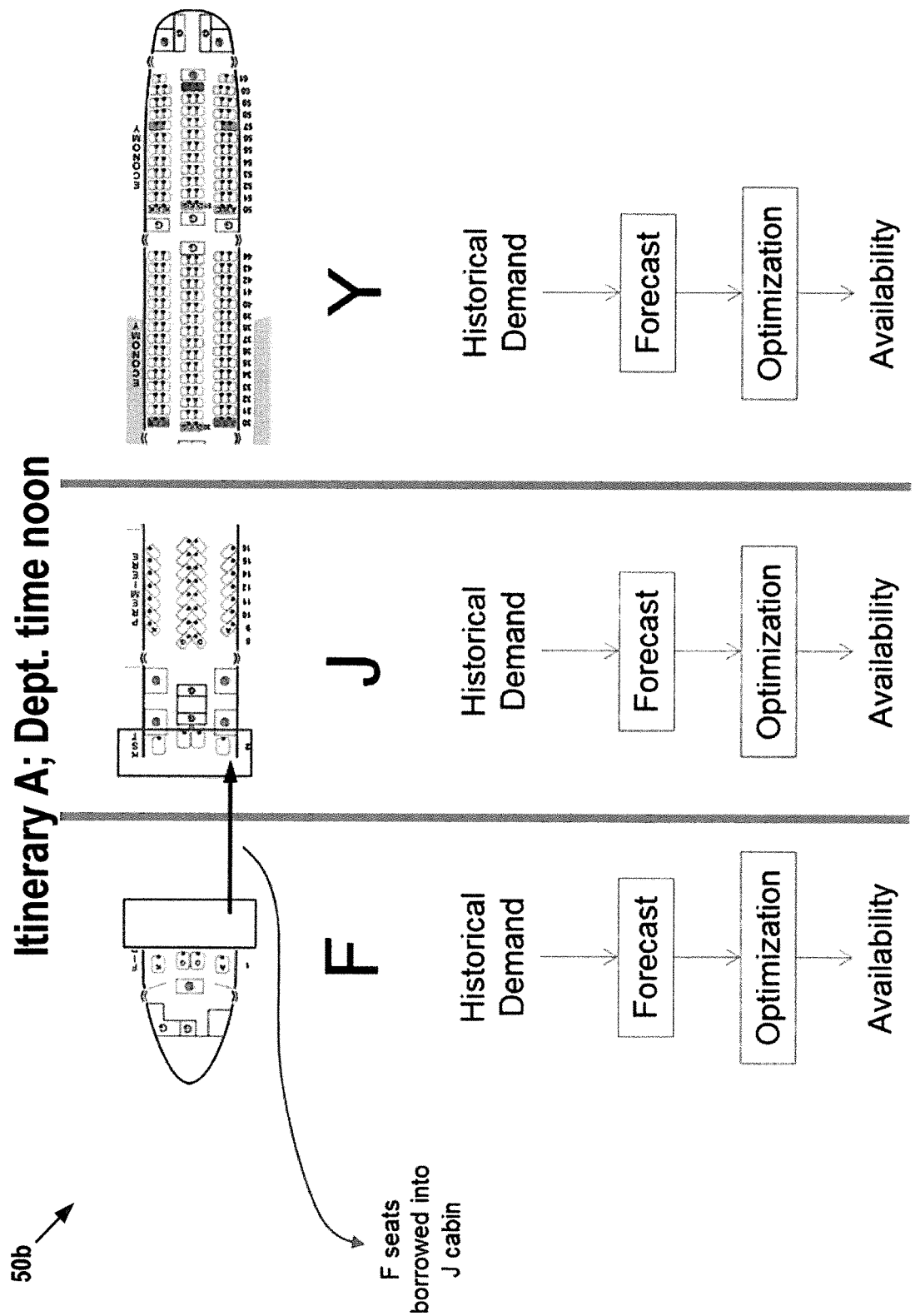
FIG. 3 is another diagrammatic illustration representing conventional methods of price optimization.

Generally, the system 10 uses a table-driven data storage system to improve upon conventional seat inventory yield management systems. The technical field of seat inventory yield management is focused on determining how much to charge for seats that are available for sale. This technical field of seat inventory yield management is present in the airline industries, which have large and complex yield management systems, and other modes of transportation such as railroads. Conventional systems in this technical field segregate demand predictions by individual departure times in the schedule and by travel class or cabin. FIG. 2 is a diagrammatic illustration 50a representing conventional methods of price optimization that segregate demand based on cabin classification and departure time. For example, historical demand for cabin F on itinerary A with departure time of noon; historical demand for cabin J on itinerary A with departure time of noon; and historical demand for cabin Y on itinerary A with departure time of noon are calculated separately and individually. When there is demand pressure in a cabin, an airline may make "virtual" adjustments on the supply side. For example, when seats for cabin J on itinerary A with departure time of noon are overbooked, then seats from cabin F are "borrowed" on itinerary A with departure time of noon. FIG. 3 is a diagrammatic illustration 50b representing conventional methods of cabin sharing or cabin borrowing. That is, for air travel, conventional technology links different cabins in the same flight by assuming that a subset of seats in a higher priced cabin (for example, First class or F class) can be offered for sale in the lower priced cabin (for example, Business class or J class). The excess sales for the lower-priced cabin are usually resolved at departure by upgrading some passengers to the higher priced cabin. These methods are commonly known as Cabin Sharing or Cabin Borrowing. However, these methods always assume that a particular unit of demand can only be interested in purchasing products associated with a single cabin category of the aircraft and at a specific departure time.

Figure 4:
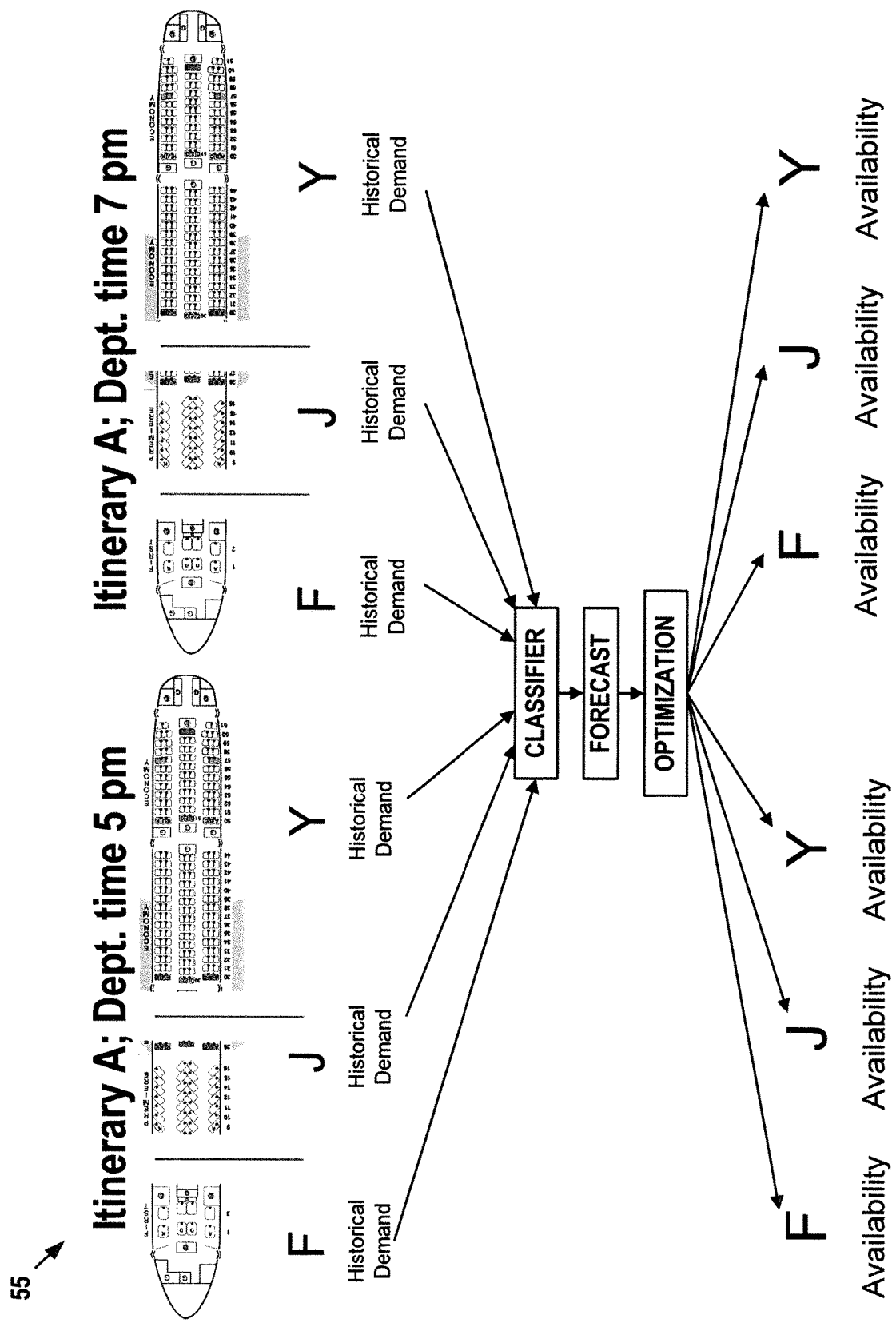
FIG. 4 is a diagrammatic illustration representing price optimization using the system of FIG. 1, according to an example embodiment.

FIG. 4 is a diagrammatic illustration 55 representing price optimization, using the system 10, in which demand is aggregated across cabin classifications and departure times. The system 10 accounts for passengers that typically shop for travel products across departure times and cabins. This is different from existing seat inventory yield management systems that assume demand is separated by cabin and almost always by flight/routing (see FIGS. 2 and 3). As illustrated in FIG. 4, the demand for a particular market (i.e., itinerary A with departure time at 5 pm and itinerary A with departure time at 7 pm) is integrated upstream of the process of creating availability for that particular market. That is, the historical demand for cabins F, J, Y in itinerary A with departure time at 5 pm, and the historical demand for cabins F, J, and Y in itinerary A with departure time at 7 pm, are aggregated prior to calculating a demand forecast and price optimization based on the calculated demand forecast. Unlike the conventional technology that, when particular cabins in particular departure times are fully booked, cannot use the known demand associated with the cabins being fully booked from one cabin to other cabins in the same flight or other cabins in other flights, the system 10 is capable of using booked demand as a signal of increased demand from one cabin to other cabins in the same flight or other cabins in other flights. For example, the market Dallas-London (itinerary A) has 2 flights departing at 5 pm and 7 pm. Both flights are served by aircraft with three cabins: coach, business and first. When the coach class on the 7 pm departure time sells out, the demand, or passengers, that still prefer to buy that departure time and cabin, will migrate to other cabins and flights, such as for example the coach cabin in the Dallas-London flight at 5 pm. By integrating the optimization across departure times and cabins, the market prices can be adjusted to account for that migration of demand. The improved system 10 leads to market prices that better reflect customers' willingness to pay for a particular service. While the example discusses two flights and three cabin options, the number of flights can be 3, 4, or more and there can also be four cabin options (e.g., coach, premium economy, business and first) or more.

In some example embodiments and using the system 10, the demand is defined at a market segment level. Generally, a market can be defined in two ways. The first way is at the origin/destination (O/D) level (for example—all passengers that want to travel between Vancouver and Cancun), regardless of paths or number of stops to reach the destination starting at the origin. The second way is at the leg level. In the second way, the market is comprised of all passengers flying nonstop between two airports, regardless of their initial origin or final destination. An example would be all passengers that may fly between Dallas and Cancun on a nonstop flight, regardless of their origin or destination points.

The market divides itself into multiple segments. Typical market segments can be business travelers with a corporate account, budget holiday travelers, or the like. These market segments may prefer to book a variety of premium cabins, departure times, and products. For example, for a market segment including wealthy individuals purchasing holiday travel, these individuals may consider multiple departure times, and depending on availability and price, they may consider potentially different premium cabins to travel on. The introduction of additional premium cabin categories (e.g., first class, business class, premium economy, etc.) requires effective cross-cabin modeling to reflect the demand across multiple premium cabins.

Previously, premium cabin (e.g., first class, business class, premium economy, etc.) availability was managed through user-set rules in a graphical user interface (GUI) such as, for example, the Odyssey GUI from Synopsys® of Mountain View, Calif. USA; these premium rules: (i) accepted, adjusted or overrode a traffic forecast created in the HERC forecast system; (ii) placed bounds on seat protections for each class considering user-modified forecasts; (iii) determined how much availability for upgrades and redemptions is provided; and (iv) calculated final seat protection for each class based on a parameter provided by the user which represents randomness or variability around the expected forecast. Absent a user-defined rule for a market, a default rule was used. Prior systems were rule-driven as opposed to using systematic revenue maximization with an optimizer. Previously, seat protections were shipped to a computer reservation system or Global Distribution System (GDS) such as, for example, SABRE, for each premium fare class and for each flight departure, with multi-leg availability requiring that the fare class be available in each leg. The systems were generally limited in their ability to evaluate and apply seasonality of demand and identify holidays, and premium cabins in the same flight departure were evaluated and protected independently.

In an example embodiment, the system 10 addresses: the trend of increasing paid load factors in premium cabins, which creates seat scarcity that can be monetized; the introduction of more cabins in a single aircraft (for example, the introduction of Premium Economy); the existence of multiple premium cabins, which requires effective cross-cabin modeling; and multiple price points to maximize demand captured. In an example embodiment, the system 10 takes into account that: premium cabins have distinct requirements with fewer and more spaced price points than much larger coach cabins; the hard product in premium cabins has long transition cycles with customers expressing clear preference for newer products in markets with mixed equipment types; and/or changes in distribution such as upgrades sold as ancillaries, direct channels and improved passenger service systems (PSS) that create new requirements and opportunities in yield management systems.

Specifically, the system 10 represents the attractiveness of each product for a market segment (e.g., wealthy individuals on holiday) by a utility function—a set of numerical parameters that scores how attractive each product is for the market segment. Once every combination of market segment and product is scored through a utility function, market shares for each market segment and product can be estimated through any existing discrete choice model or combinations thereof, such as multinomial logit models or a probit model. In order to create optimal prices to be offered to market segments for each product, the utility functions contain price variables, that is, they are not initially entirely resolved to a single numerical value. In several example embodiments, the market shares derived from the utility functions are then inserted into a numerical optimization problem that seeks to maximize revenue constrained by the number of seats available to sell. In several example embodiments, this numerical optimization problem can be solved through commercial software or heuristics, leading to a set of optimal prices.

Figure 5:
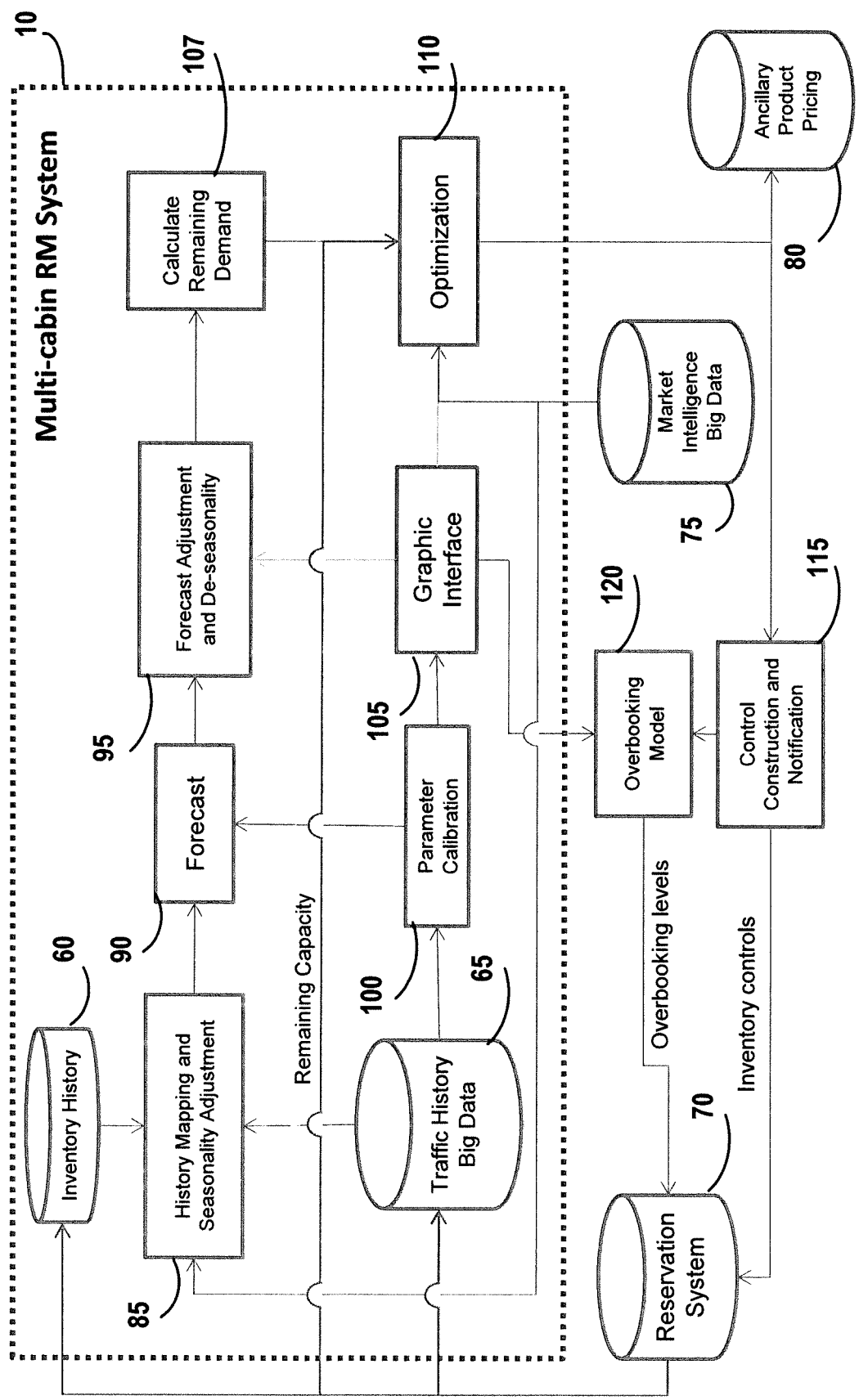
FIG. 5 is a diagrammatic illustration of a high level architecture of the system of FIG. 1, according to an example embodiment.

In an example embodiment, referring to FIG. 5, a high level architecture and interfaces of an example embodiment of the system 10 is illustrated. As shown in FIG. 5, the system 10 includes an inventory history database 60, a traffic history big database 65, a reservation system database 70, a market intelligence big database 75, and an ancillary product pricing database 80. The system 10 includes a history mapping and seasonality adjustment module 85, a forecast module 90, a forecast adjustment and de-seasonality module 95, a parameter calibration module 100, a graphic interface 105, a remaining demand calculation module 107, an optimizer or optimization module 110, a control construction and notification module 115, and an overbooking model 120. In several example embodiments, the architecture and interfaces illustrated in FIG. 5 are a non-conventional and non-generic arrangement of pieces, at least because of the arrangement of the forecast adjustment and de-seasonality module 95 relative to the optimization module 110, and because the forecast module 90 aggregates demand across departures times and across cabin classes. In several example embodiments, the multi-cabin aspect of the system 10 of FIG. 5 provides a non-conventional and non-generic arrangement of the pieces of the system 10 and its associated method(s). In several example embodiments, the multi-cabin aspect, and the multi-departure aspect in the same market on the same day, provide a non-conventional and non-generic arrangement of the pieces of the system 10 and its accompany method(s). In several example embodiments, the integration of the cabins upstream of the process of creating availability provides a non-conventional and non-generic arrangement of the pieces of the method(s) associated with the system 10 of FIG. 5.

Figure 6A:
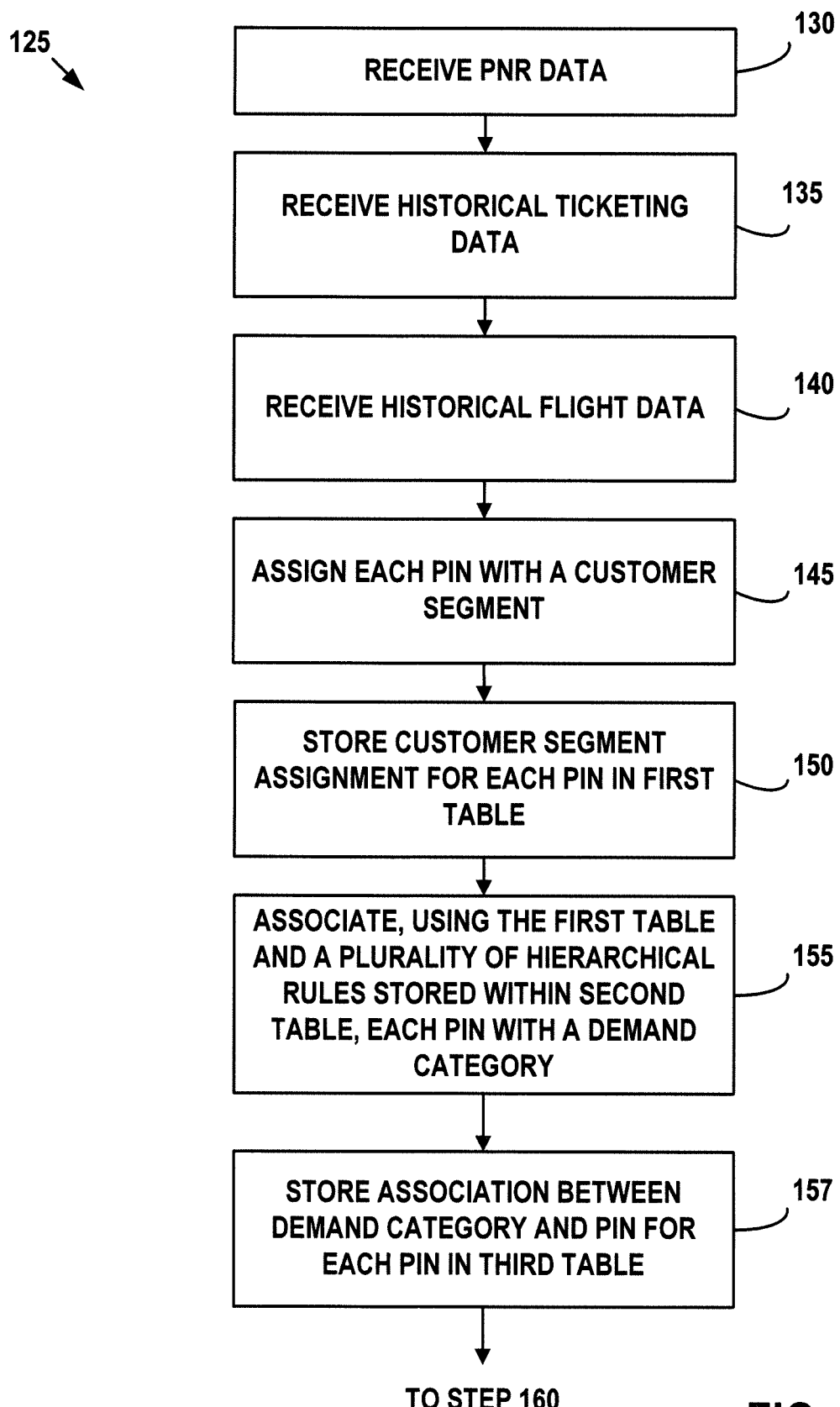
FIGS. 6A and 6B together form a flow chart illustration of a method of operating the system of FIG. 1, according to an example embodiment.
Figure 6B:
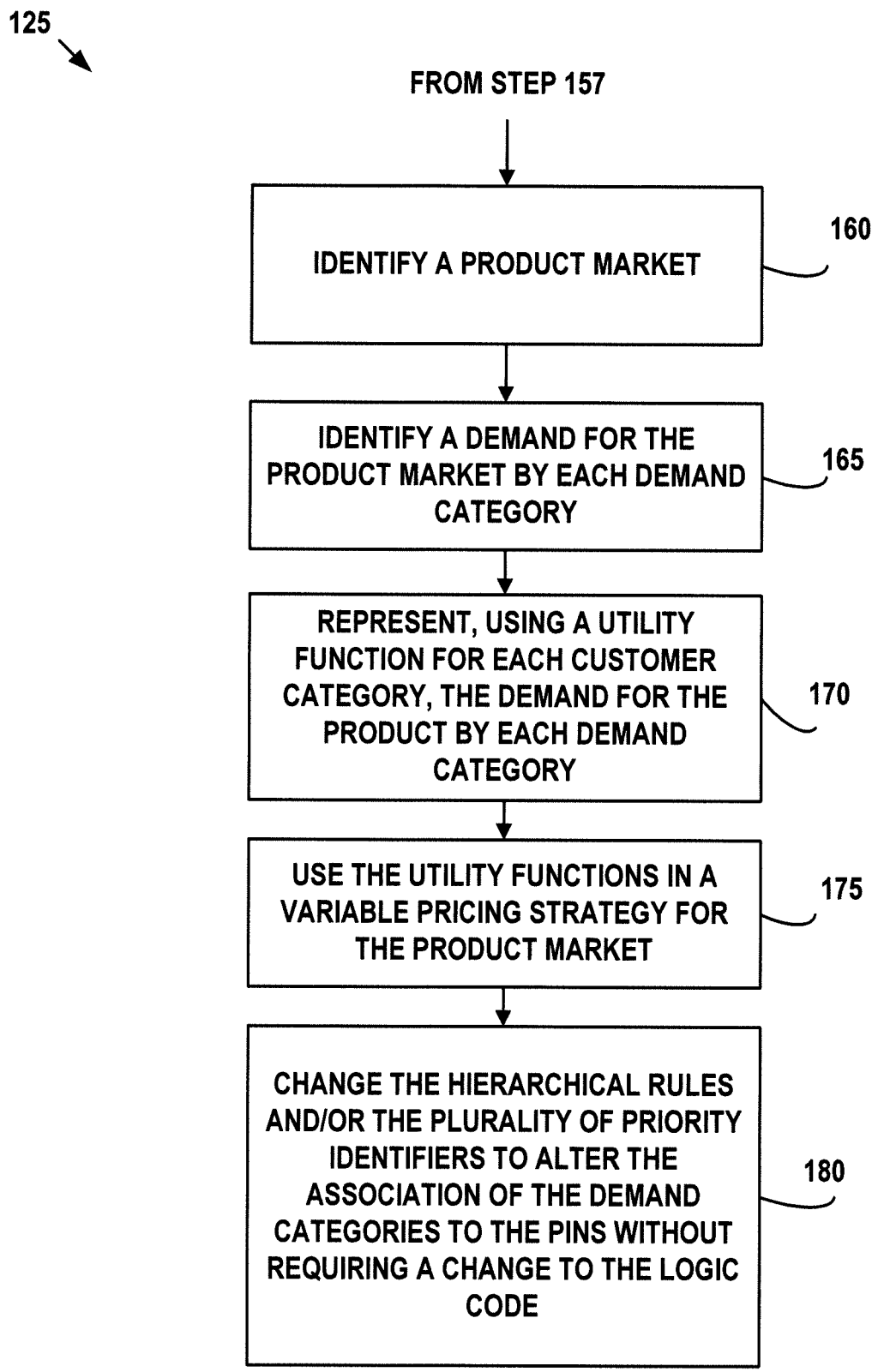

In an exemplary embodiment, as illustrated in FIGS. 6A and 6B with continuing reference to FIGS. 1, 4, and 5, a method 125 of operating the system 10 includes receiving passenger name record ("PNR") data at step 130; receiving historical ticketing data at step 135; receiving historical flight data at step 140; assigning each PIN with a customer segment at step 145; storing a customer segment assignment for each PIN in first table at step 150; associating, using the first table and a plurality of hierarchical rules stored within the second table, each customer segment with a demand category at step 155; storing the association between demand category and PIN for each PIN in a third table at step 157; identifying a product market at step 160; identifying a demand for the product market by each demand category at 165; representing, using a utility function for each demand category, the demand for the product by each demand category at step 170; using the utility function in a variable pricing strategy for the product market at 175; and changing the hierarchical rules and/or a plurality of priority rule identifiers to alter the association of the customer categories to the customer segments without requiring a change to the logic code at step 180.

At the step 130, PNR data for a plurality of passengers is received by the computer 25 or using the computer 25. As shown in the table identified by the numeral 200 in FIG. 7, the PNR data can often include a PNR identifier, such as PNR identifier 200*a*. Each PNR identifier is associated with: one or more of a party ID, a passenger count, an origination location, a destination location, a PNR date, a departure date, a flight number, and a cabin identifier. For example, the PNR identifier 200*a* is associated with a party ID 200*b*, a passenger count 200*c*, one or more passenger IDs 200*d*; an origination location 200*e*; a destination location 200*f*; a PNR date 200*g*, a departure date 200*h*, a flight number 200*i*, and a cabin identifier 200*j*. Generally, an itinerary is defined by the origination location and the destination location, and may also include the departure date and the flight number. As the PNR data is generally historical PNR data, each of the data included or associated with the PNR data is historical data. For example, the itinerary is a historical itinerary. Thus, the PNR identifier 200*a* is associated with the historical itinerary of the origination location 200*e*, the destination location 200*f*, on flight number 200*i* on PNR date 200*g*. In some embodiments, the PNR data is received by the forecast module 90 and from the reservation system database 70 and/or the inventory history database 60. However, in other embodiments, the PNR data is received by any one of the modules 85, 90, 95, 105, 107, 110, 110, 120, and 115. In some embodiments, the PNR data is received from any one of the other modules 85, 90, 95, 105, 107 110, 110, 120, and 115 and/or the databases 60, 65, 70, 75, and 80. Generally, at least a portion of the PNR data is generated when a reservation is made.

At the step 135, historical ticketing data is received by the computer 25 or using the computer 25. As shown in the table identified by the numeral 205 in FIG. 8, the historical ticketing data includes a fare paid by (or charged by the airline for) each passenger for each passenger's historical itinerary associated with a PNR. For example, a fare 200*k*, a coupon identifier 200*l*, and a ticket date 200*m* are each associated with the PNR identifier 200*a* and party ID 200*b*. In some embodiments, the historical ticketing data is received by the forecast module 90 and from the reservation system database 70 and/or the inventory history database 60. However, in other embodiments, the historical ticketing data is received by any one of the modules 85, 90, 95, 105, 107, 110, 110, 120, and 115. In some embodiments, the historical ticketing data is received from any one of the other modules 85, 90, 95, 105, 107, 110, 110, 120, and 115 and/or the databases 60, 65, 70, 75, and 80. Generally, the historical ticketing data is generated when payment is received and a ticket is created.

At the step 140, historical flight data is received by the computer 25 or using the computer 25. As shown in the table identified by the numeral 210 in FIG. 9, the historical flight data includes an assigned seat for each passenger for the passenger's historical itinerary. In some examples, the flight data further comprises a number of requested upgrades for each PIN (Pax ID). Thus, the PNR identifier 200*a* is further associated with a seat 200*n*. In some embodiments, the historical flight data is received by the forecast module 90 and from the reservation system database 70 and/or the inventory history database 60. However, in other embodiments, the historical flight data is received by any one of the modules 85, 90, 95, 105, 107, 110, 110, 120, and 115. In some embodiments, the historical flight data is received from any one of the other modules 85, 90, 95, 105, 107, 110, 110, 120, and 115 and/or the databases 60, 65, 70, 75, and 80. Generally, the historical flight data is generated when a flight is flown.

At the step 145, each PIN is assigned to a customer segment from a plurality of customer segments. The assignment is based on the PNR data, the ticketing data, and the historical flight data. Additionally, each PIN is assigned to, or associated with, a premium propensity rating, an upgrade request frequency, and a preferred cabin. Generally, these assignments and associations are accumulated over time and is dependent upon multiple itineraries booked and flown by each passenger.

At the step 150, the customer segment assignment for each PIN, or Pax ID as shown in the respective tables of FIGS. 7-9, is stored in a first table. As shown in the table identified by the numeral 215 in FIG. 10, the table 215 stores data related to each PIN. For example, the PIN 200d is associated with, or assigned to, a segment of "Personal", a Premium Propensity rating of "Medium", an Upgrade Requests of "50%", and a preferred cabin of J. Generally, the premium propensity rating for each PIN is based on the number of requested upgrades for each PIN.

At the step 155, each PIN is associated with a demand category, using the first table and a plurality of hierarchical rules stored within a second table. In some examples, the demand categories include the following categories: personal; small business; contract; upgrade; premium; and redemption. However, categories may be deleted and other categories may be added and/or created for a variety of reasons. As shown in the table identified by the numeral 220 in FIG. 11, the table 220 includes a plurality of cells forming a plurality of rows 220a and a plurality of columns 220b. The plurality of hierarchical rules is stored within the plurality of cells, with each rule being associated with one of the rows 220a. A plurality of priority identifiers 220c is also stored within the plurality of cells, wherein the priority identifiers 220c are associated with one column. Each priority identifier 220c is also associated with one hierarchical rule to rank the plurality of hierarchical rules. The plurality of hierarchical rules determines the demand category associated with each PIN. As shown in FIG. 11, the highest ranked rule assigns the PINs associated with the segment that always equals to "corporate" to the "contract category". The second highest ranked rule assigns the PINs associated with premium propensity equaling "always" to the "premium category". Multiple other rules are contemplated, such as for example another rule that associates travel itineraries booked far in advance with a category that is not corporate.

At the step 157, the association between the demand category and a PIN for each PIN is stored in a third table. As shown in the table identified by the numeral 225 in FIG. 12, the table 225 stores the demand category for each PIN. Thus, the PNR 200a and PIN 200b are associated with the demand category of "Personal".

At the step 160, a product market is identified using the computer 25. Generally, the product market is based on the historical flight data and is defined by historical itineraries having a plurality of departure times and a plurality of cabin classifications. In some embodiments, the historical itineraries forming the product market have an identical initial origination location and an identical final destination location and/or are non-stop travel legs between an identical origination location and an identical destination location. For example, a first itinerary of the historical itineraries has a first departure time from an origination location; a second itinerary of the historical itineraries has a second departure time from the same origination location; and the first departure time is different from the second departure time. Additionally, the first itinerary of the historical itineraries forming the product market has a first cabin classification; the second itinerary of the historical itineraries forming the product market has a second cabin classification; and the first cabin classification is different from the second cabin classification.

At the step 165, a demand for the product market by each demand category is identified using the computer 25 and is based on the second table, the historical flight data, and the product market.

At the step 170, the demand for the product market by each demand category is represented using a utility function for each demand category. That is, the system 10 uses the historical demand, classified and aggregated according to PNR and ticket characteristics (e.g., fare paid, assigned seat, historical itinerary), to forecast demand by category.

At the step 175, the utility functions are used in a variable pricing strategy for the product market. In an example embodiment, the optimization module 110 provides for the joint optimization of all premium cabins in all airline flights on the same departure date. In several example embodiments, all premium cabins for the same departure date are optimized jointly. Using the utility functions in the variable pricing strategy includes forecasting future demand based on market segment and/or demand category.

At the step 180, the hierarchical rules and/or the plurality of priority identifiers are changed to alter the association of the demand categories to the PINs without requiring a change to the logic code. In an example embodiment, the PIN assignment to a customer segment during the step 145; the PIN assignment to a premium propensity; and/or the association of the customer segment to a demand category during the step 155 includes execution of logic code. In previous systems, the logic code was hard-coded in a graphics interface. Specifically, the logic code regarding the hierarchy, based on price, of fare classes was generally hard-coded in the graphics interface. For example, the fare classes for first class domestic may have F, A, P as fare codes, with F fare code being more expensive than A fare code, and A fare code being more expensive than P fare code. Thus, the logic code included a set of fare class categorization rules. To change the hierarchical ranking of the fare codes, changes to the logic code were required in previous systems. These changes to the logic code resulted in unintended consequences, as many other systems and agreements with customers and partners depended on the hierarchical ranking or sequence. Extensive testing and validation were required when logic code was edited/altered, which was expensive and time consuming. The creation of additional premium classes and fares needed to be reflected in a yield management system without requiring extensive edits to the logic code. Other changes reflecting changes in distribution, such as upgrades sold as ancillaries, and the fact that direct channels and improved passenger service systems (PSS) create new requirements and opportunities in yield management systems, also need to be reflected in the yield management system without requiring extensive edits to the logic code. With the system 10, the rules within the table 220 are capable of being changed or otherwise altered to reflect changes in, for example, how a fare class is identified and/or ranked relative to other fare classes, without having to change the logic code, such as the logic code executed during the PIN assignment to a customer segment.

As described, the system 10 is a yield management system, specifically a multi-cabin, multi-travel leg yield management system. In an example embodiment, in the yield management system 10, the cabins are integrated upstream of the process of creating availability; in several example embodiments, the system 10 also enables the integration of multiple departures in the same market in the same day. In several example embodiments, historical demand is classified into market segments, future demand is forecasted by segment, and the revenue potential of future demand is maximized through an optimization problem that considers all market segments and all cabins and flight itineraries over a single day. In several example embodiments, revenue management methods using the system 10 can be used for models in, for example, Revenue Management, Network Planning, Fleet Planning, or any combination thereof. In several example embodiments, the system and revenue management systems 10 significantly improve yield management, leading to greater market efficiency.

As described, the system 10 provides a rule-driven categorical forecast, relying on historical data that is classified and aggregated according to passenger name record (PNR) and ticket characteristics, so that similar traffic belongs to the same forecast category or demand category. In several example embodiments and using the system 10, table-driven categorization of demand can adjust during the evolution of the premium product mix offered by the commercial carrier, such a commercial airline. This adjustment can occur without the need for extensive information technology (IT) rework, thereby improving the performance of the computer system itself. In several example embodiments, the forecast module 90 is built with sufficient flexibility to avoid the expensive need of IT going into the code to make changes. In an example embodiment, the fare classes (F, A, P fare codes) for first class domestic have a hierarchy with F more expensive than A, and A more expensive than P. Instead of this sequence being hard-coded in the existing graphics interface 105, it is reflected in the table 225, which includes the relationship between customer segments and a demand category—as a result, in several example embodiments, any classification changes can be done without IT revising the computer code. For example, F, A, P fare codes are easily reordered in the table 225 to reflect F, P, A, with F more expensive than P, and P more expensive than A. As a result, in several example embodiments, only the table 225 is revised, reducing the chance of error. In several example embodiments, a particular customer segment—e.g., passengers that buy first class tickets associated with a cruise—are identified as a significant travel segment with unique purchase behavior; using the table 225, a segment is created directly without computer code re-write. In several example embodiments, the table-driven categorization improves the performance of the computer system itself, reducing computer system downtime and reducing the chance of introducing error into the system due to code revisions or re-write.

In an example embodiment, to maximize revenue for a single market such as, for example, the market between Dallas-Fort Worth and Los Angeles, the product market is defined using two market segments, two flight departures, and two cabins in each flight. As illustrated in table identified by the numeral 230 of FIG. 13, the two market segments are segment A and segment B. Segment A is comprised of people traveling for business and segment B is comprised of people traveling for personal reasons. The two flight departures are identified as "Flight 1" and "Flight 2." The two cabins in each flight are First Class F and Economy Class Y. The value that each market segment places on each cabin/market combination is represented by a utility function. $U_{AF1}$ represents the utility function for market segment A in F cabin on Flight #1; $U_{AY1}$ represents the utility function for market segment A in Y cabin on Flight #1; $U_{AF2}$ represents the utility function for market segment A in F cabin on Flight #2, and so on.

In several example embodiments, the utility function has multiple components representing how customers value product attributes in a linear form. In several example embodiments, such components vary and are aggregated depending on the scope of the application. In connection with the table 230, all product attributes are aggregated into two attributes, namely price and product quality; product quality includes all non-price attributes passengers consider when making a choice, such as airline brand, cabin, seating, amenities, aircraft type and departure time—each of these components in the utility function is represented by a product of the weight parameter beta times the product specific score, for example:

$$U_{AF1} = \beta_{pA} p_{F1} + \beta_{qA} q_{F1} \quad (1)$$

Where:

$\beta_{pA}$ is the price sensitivity weight for market segment A;

$p_{F1}$ is the price asked for a seat in cabin F in flight 1;

$\beta_{qA}$ is the service quality weight for market segment A; and $q_{F1}$ is the quality score for a cabin F in flight 1.

In several example embodiments, betas have numerical values that originated in a calibration exercise using existing market or traffic data. In several example embodiments, the calibration to determine betas consists of finding values that minimize prediction error. In several example embodiments, beta values for price are almost always negative; in several example embodiments, as price increases, passengers become more averse to purchasing. In several example embodiments, beta values for overall product quality are almost always positive; in several example embodiments, as product quality increases, passengers become more willing to purchase. In some example embodiments, the parameter calibration module 100 originates the betas using data from the traffic history big database 65.

In the example shown in FIG. 13, Segment A of table 230 is made of business travelers, which are less price sensitive than segment B. However, business travelers are generally more concerned about product attributes than leisure travelers. Considering these aspects of the marketing segmentation, the following numerical values are used for betas:

$$\beta_{pA} = -1 \quad (2)$$

$$\beta_{pB} = -3 \quad (3)$$

$$\beta_{qA} = 3 \quad (4)$$

$$\beta_{qB} = 0.5 \quad (5)$$

In the utility functions and in several example embodiments, the quality of each product is expressed numerically. In several example embodiments, product quality is measured through pre-defined scores. In an example embodiment, a product quality metric includes two components, namely: a first component that scores popularity of departure time, varying on a scale from 0 to 1, 0 being the least popular departure time (e.g., 3 am) and 1 being the most popular departure time (e.g., 8 am); and a second component that scores the attractiveness of the cabin, varying on a scale from 0 to 1, where 0 is no-frills economy and 1 is the latest seating product available in first class. In several example embodiments, numerical qualities are as follows:

$$q_{F1}=1.2 \quad (6)$$

$$q_{F2}=2 \quad (7)$$

$$q_{Y1}=0.8 \quad (8)$$

$$q_{Y2}=0.4 \quad (9)$$

In several example embodiments, regarding the optimization step, with quality of service and betas expressed numerically, the utility functions are only a function of price. In several example embodiments, market share for each market segment and each product can be expressed as a function of the utility functions. In several example embodiments, a model employed to estimate market share is the multinomial logit model (MNL), which assumes that the log of the market shares follow a linear relationship to the utility function. In several example embodiments, market shares can be estimated with exponential ratios, for example for market segment A:

$$S_{AF1} = \frac{e^{U_{AF1}}}{\sum_{cl} e^{U_{AF1}}} \quad (10)$$

Where:
$S_{AF1}$ is the predicted market share for the First class cabin in Flight number 1.

In several example embodiments, instead of MNL, one or more other models for market share may be employed.

In several example embodiments, the only values to be determined in the utility functions are prices, and when substituting the above-identified parameter examples, the share for Segment A in the first class cabin of flight number 1 is obtained as follows:

$$S_{AF1}(P) = \frac{e^{3.6-p_{F1}}}{e^{3.6-p_{F1}} + e^{6-p_{F2}} + e^{2.4-p_{Y1}} + e^{1.2-p_{Y2}}} \quad (11)$$

The four unknown elements of vector P are the prices to charge for each one of the two cabins in flight numbers 1 and 2. Therefore, the problem becomes to determine the vector of prices p that maximizes total revenue—in vector form:

$$\text{Max } R = DS(p)p \quad (12)$$

$$\text{Subject to } DS(p) \leq C \quad (13)$$

Where:
D is the demand vector;
S is the market share vector as a function of asking prices p;
C is the remaining capacity vector;
The D vector has two components, one for each market segment;
The S vector has eight components, one for each combination of market segment, flight and cabin; and
The C vector has four components, one for each cabin/flight departure combination.

Even the smallest revenue management problems existing in practice cannot be solved manually. For example and considering the market between Dallas and Los Angeles, the passengers are segmented into 8 categories. Passengers that only fly this segment or that are connecting passengers, have different levels of sensitivity to price and product attributes. When the market is served by 15 flight departures per day, each one with two cabins, with a total of 30 price variables to be determined, then the share vector contains 240 elements, one for each combination of market segment, flight departure and cabin.

In several example embodiments and as noted above, passengers shop for travel across departure times and cabins. In an example embodiment, the market Dallas-London has 3 flights at 5 pm, 7 pm and 9 pm, respectively. All of them are served by aircraft with four cabins: coach, premium economy, business, and first class. Assume the 7 pm premium economy sells out. The demand that still prefers to buy that departure time and cabin will migrate to other cabins and flights. In several example embodiments, by integrating the optimization across departure times and cabins, the system 10 and/or the method 125 account for that migration in the creation of market prices, and the improved model leads to market prices that better reflect customers' willingness to pay for a particular service. In several example embodiments, by including multiple cabins, the seat inventory yield management system 10 creates prices that lead to overall higher revenue.

Figure 14:
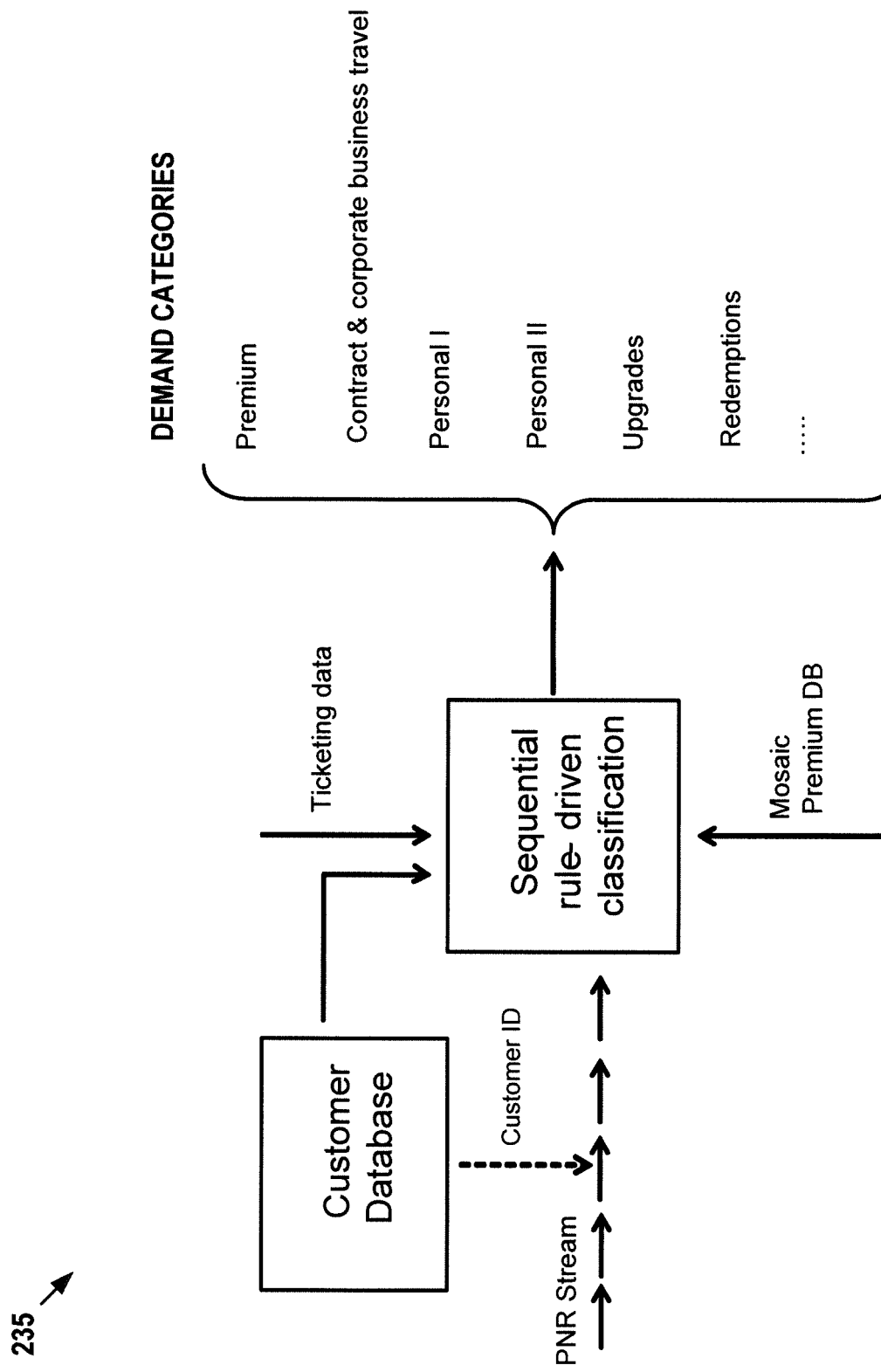
FIG. 14 is a diagrammatic illustration of data flow during the method of FIGS. 6A and 6B, according to an example embodiment.

As illustrated in FIG. 14, a data flow during the method 125 is represented by the number 235. Generally, the system 10 accumulates and aggregates data required to categorize each passenger into a demand category from a variety of sources. The system 10 identifies the historical demand of products by each demand category to price future demand of products. For example, if the system 10 identifies that historically, 20% of passengers assigned a seat in business class on itinerary A at noon departure time are associated with a "corporate" category, which is known to book close to departure time without sensitivity to price, the system 10 prices a portion of future seats in business class on itinerary A at noon departure time accordingly.

Figure 15:
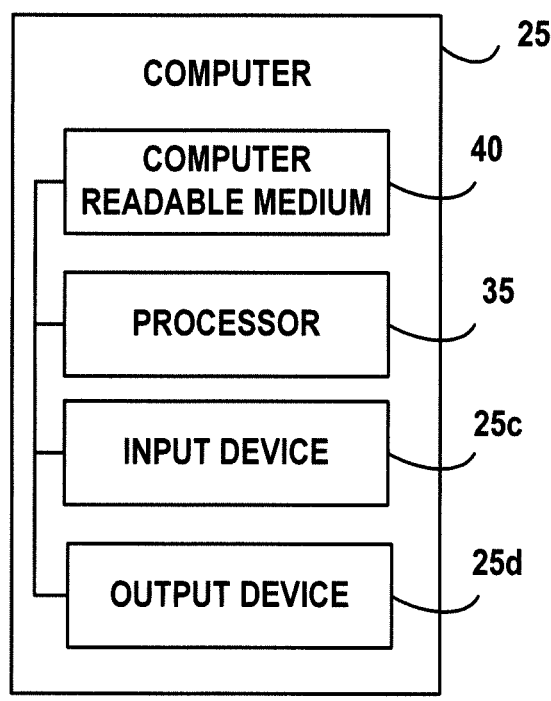
FIG. 15 is a diagrammatic illustration of the computer of FIG. 1, according to an example embodiment.

In an example embodiment, as illustrated in FIG. 15 with continuing reference to FIG. 1, the computer 25 includes the computer readable medium 40, the processor 35, an input device 25c, and an output device 25d. In an example embodiment, instructions accessible to, and executable by, the processor 35 are stored in the computer readable medium 40. In an example embodiment, the input device 25c is a keyboard, mouse, microphone, or other device coupled to the computer 25 that sends instructions to the computer 25. In an example embodiment, the input device 25c and the output device 25d include a graphical display, which, in several example embodiments, is in the form of, or includes, one or more digital displays, one or more liquid crystal displays, one or more cathode ray tube monitors, and/or any combination thereof. In an example embodiment, the output device 25d includes a graphical display, a printer, a plotter, and/or any combination thereof. In an example embodiment, the input device 25c is the output device 25d, and the output device 25d is the input device 25c. In several example embodiments, the computer 25 is a thick client. In several example embodiments, the computer 25 functions as both a thin client and a thick client. In several example embodiments, the computer 25 is, or includes, a telephone, a personal computer, a personal digital assistant, a cellular telephone, other types of telecommunications devices, other types of computing devices, and/or any combination thereof. In several example embodiments, the computer 25 includes a plurality of remote user devices. In an example embodiment, web browser software is stored in the computer readable medium 40. In an example embodiment, the computer 25 is capable of running or executing the history mapping and seasonality adjustment module 85, the forecast module 90, the forecast adjustment and de-seasonality module 95, the parameter calibration module 100, the remaining demand calculation module 107, the optimizer or optimization module 110, the control construction and notification module 115, and the overbooking model 120, or other application, module, or software program relating to the system 10. In one or more example embodiments, the system 10 includes an application server, which in several example embodiments includes and/or executes one or more web-based programs, Intranet-based programs, and/or any combination thereof. In an example embodiment, the system 10 includes a computer program including a plurality of instructions, data, and/or any combination thereof. In an example embodiment, the application is written in, for example, HyperText Markup Language (HTML), Cascading Style Sheets (CSS), JavaScript, Extensible Markup Language (XML), asynchronous JavaScript and XML (Ajax), and/or any combination thereof. In an example embodiment, the system 10 includes a web-based application written in, for example, Java or Adobe Flex, which pulls real-time information from another computer and/or the plurality of data sources 20. In an example embodiment, the system 10 pulls real-time information from the plurality of data sources 20, upon the execution, opening or start-up of the application. In an example embodiment, the computer 25 may include a specially designed code, such as for example SAS code and/or UNIX. In an example embodiment, the SAS code allows communication with an external database, such as a database associated with one or more of the plurality of data sources 20.

In an example embodiment, the remote user device 15 is a computing device and also includes an input device and an output device similar to the input device 25c and the output device 25d of the computer 25. However, any type of input device and output device may be used. In several example embodiments, the remote user device 15 is a thin client. In several example embodiments, the remote user device 15 is a thick client. In several example embodiments, the remote user device 15 functions as both a thin client and a thick client.

In an example embodiment, as illustrated in FIG. 1, the plurality of data sources 20 includes the inventory history database 60, the traffic history big database 65, the reservation system 70, the market intelligence big database 75, and the ancillary product pricing database 80. Each of the plurality of data sources 20 may be stored on a computer that is similar or the same as the computer 25.

In an example embodiment, the network 30 includes the Internet, one or more local area networks, one or more wide area networks, one or more cellular networks, one or more wireless networks, one or more voice networks, one or more data networks, one or more communication systems, and/or any combination thereof.

Figure 16:
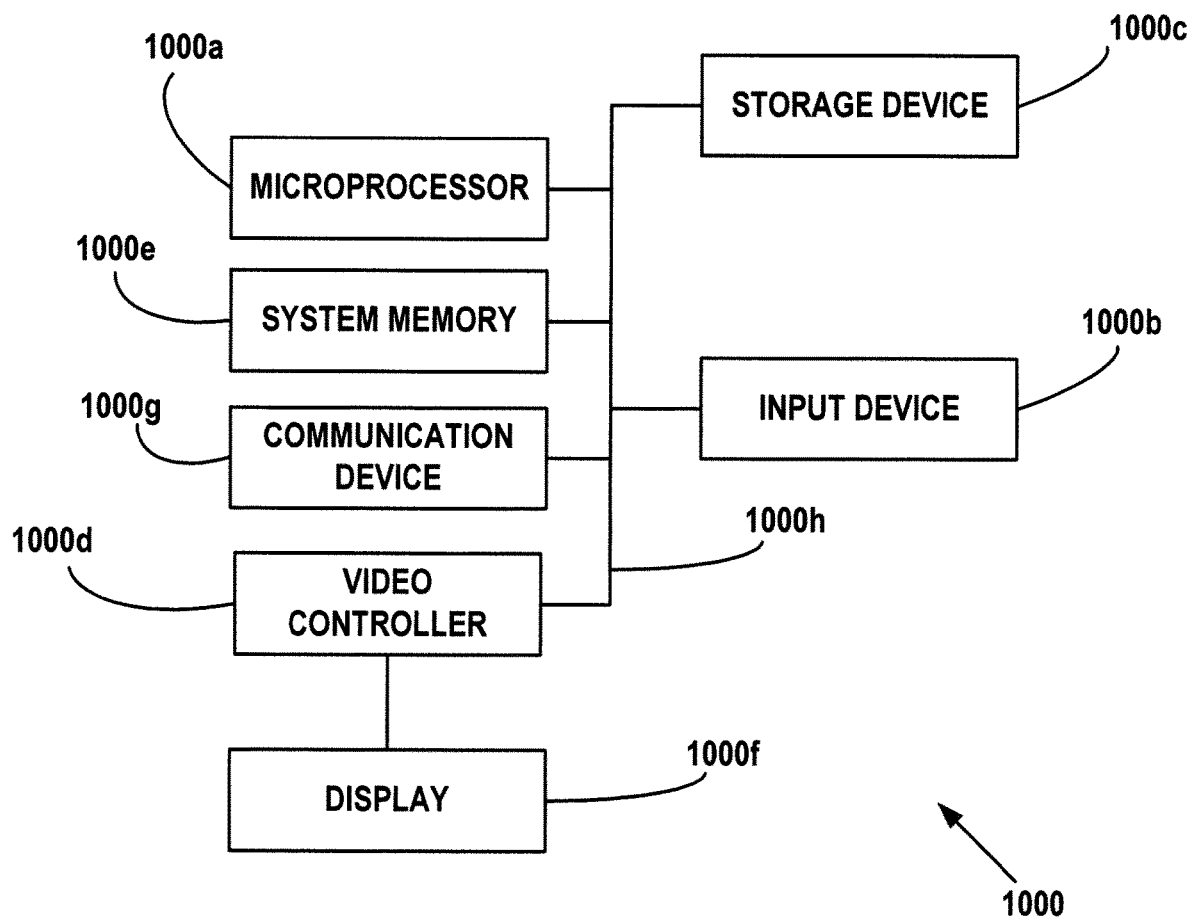
FIG. 16 is a diagrammatic illustration of a node for implementing one or more example embodiments of the present disclosure, according to an example embodiment.

In an example embodiment, as illustrated in FIG. 16 with continuing reference to FIGS. 1, 6A, 6B, and 7-14, an illustrative node 1000 for implementing one or more of the example embodiments described above and/or illustrated in FIGS. 1, 6A, 6B, and 7-13 is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several example embodiments, the storage device 1000c may include a floppy drive, hard drive, CD-ROM, optical drive, any other form of storage device and/or any combination thereof. In several example embodiments, the storage device 1000c may include, and/or be capable of receiving, a floppy disk, CD-ROM, DVD-ROM, or any other form of computer-readable medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones and cell phones.

In several example embodiments, one or more of the components of the systems described above and/or illustrated in FIGS. 1, 6A, 6B, and 7-14, include at least the node 1000 and/or components thereof, and/or one or more nodes that are substantially similar to the node 1000 and/or components thereof. In several example embodiments, one or more of the above-described components of the node 1000, the system 10 includes respective pluralities of same components.

In several example embodiments, one or more of the applications, systems, and application programs described above and/or illustrated in FIGS. 1, 6A, 6B, and 7-14, include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a non-transitory computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000*a*, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

The present disclosure introduces a method of using a table-driven data storage system in a computer system including a memory, a processor, and a display, the method including receiving, using the computer system, passenger name record ("PNR") data for a plurality of airline passengers; wherein the PNR data includes a plurality of PNRs; and wherein each PNR is associated with a passenger identification number ("PIN") of a passenger and a passenger's historical itinerary; receiving, using the computer system, historical ticketing data including a fare charged to each passenger for the passenger's historical itinerary; receiving, using the computer system, historical flight data including an assigned seat for each passenger during the passenger's historical itinerary; assigning, based on the PNR data, the historical ticketing data, and the historical flight data, each PIN with a customer segment from a plurality of customer segments; storing, in a first table of the table-driven data storage system, the customer segment assignment for each PIN; associating, using the first table and a plurality of hierarchical rules stored within a second table of the table-driven data storage system, each PIN with a demand category: wherein the second table includes: a plurality of cells forming a plurality of rows and a plurality of columns; the plurality of hierarchical rules stored within the plurality of cells, wherein each rule is associated with one row; and a plurality of priority identifiers stored within the plurality of cells, wherein the priority identifiers are associated with one column; and wherein each priority identifier is also associated with one hierarchical rule to rank the plurality of hierarchical rules; and wherein the plurality of hierarchical rules determines the demand category associated with each PIN based on the customer segment assigned to each PIN; identifying, using the computer system and based on the historical flight data, a product market defined by itineraries having a plurality of departure times and a plurality of aircraft cabin classifications; identifying a demand for the product market by each demand category using the computer system and based on the second table, the historical flight data, and the product market; representing, using a utility function for each demand category, the demand for the product market by each demand category; and using the utility functions in a variable pricing strategy for the product market. In an example embodiment, assigning each PIN with a customer segment from the plurality of customer segments includes executing logic code; and wherein the method further includes either: changing the plurality of hierarchical rules and/or the plurality of priority identifiers to alter the association of the demand categories to the PINs, without requiring a change in the logic code thereby increasing flexibility in the table-driven data storage system. In an example embodiment, each of the utility functions includes a price variable; and wherein using the utility functions in the variable pricing strategy for the product market includes aggregating demand of itineraries across aircraft cabin classification and aggregating demand of itineraries across departure times. In an example embodiment, the historical itineraries forming the product market: have an identical initial origination location and an identical final destination location; and/or are non-stop travel legs between an identical origination location and an identical destination location. In an example embodiment, the historical itineraries forming the product market have non-stop travel legs between an identical origination location and an identical destination location; wherein a first itinerary of the historical itineraries has a first departure time from the identical origination location; wherein a second itinerary of the historical itineraries has a second departure time from the identical origination location; and wherein the first departure time is different from the second departure time. In an example embodiment, the historical itineraries forming the product market have non-stop travel legs between an identical origination location and an identical destination location; wherein a first itinerary of the historical itineraries forming the product market has a first cabin classification; wherein a second itinerary of the historical itineraries forming the product market has a second cabin classification; and wherein the first cabin classification is different from the second cabin classification. In an example embodiment, the historical itineraries forming the product market have an identical initial origination location and an identical final destination location; and wherein a first itinerary of the historical itineraries forming the product market has a first departure time from the initial origination location; wherein a second itinerary of the historical itineraries forming the product market has a second departure time from the initial origination location; and wherein the first departure time is different from the second departure time. In an example embodiment, the historical itineraries forming the product market have an identical initial origination location and an identical final destination location; and wherein a first itinerary of the historical itineraries forming the product market has a first cabin classification; wherein a second itinerary of the historical itineraries forming the product market has a second cabin classification; and wherein the first cabin classification is different from the second cabin classification. In an example embodiment, the historical flight data further includes a number of requested upgrades for each PIN; and wherein the first table further stores a premium propensity rating for each PIN based on the number of requested upgrades for each PIN. In an example embodiment, the plurality of hierarchical rules determines the demand category associated with each PIN further based on the premium propensity rating associated with each PIN.

The present disclosure also introduces an apparatus including: a non-transitory computer readable medium; and a plurality of instructions stored on the non-transitory computer readable medium and executable by one or more processors, the plurality of instructions including: instructions that cause the one or more processors to receive passenger name record ("PNR") data for a plurality of airline passengers; wherein the PNR data includes a plurality of PNRs; and wherein each PNR is associated with a passenger identification number ("PIN") of a passenger and a passenger's historical itinerary; instructions that cause the one or more processors to receive historical ticketing data, wherein the ticketing data including a fare charged to each passenger for the passenger's historical itinerary; instructions that cause the one or more processors to receive historical flight data including an assigned seat for each passenger during the passenger's historical itinerary; instructions that cause the one or more processors to assign, based on the PNR data, the historical ticketing data, and the historical flight data, each PIN with a customer segment from a plurality of customer segments; instructions that cause the one or more processors to store in a first table of the table-driven data storage system, the customer segment assignment for each PIN; instructions that cause the one or more processors to associate, using the first table and a plurality of hierarchical rules stored within a second table of the table-driven data storage system, each PIN with a demand category; wherein the second table includes a plurality of cells forming a plurality of rows and a plurality of columns; wherein the plurality of hierarchical rules are stored within the plurality of cells, wherein each rule is associated with one row; wherein a plurality of priority identifiers are stored within the plurality of cells, wherein the priority identifiers are associated with one column; wherein each priority identifier is also associated with one hierarchical rule to rank the plurality of hierarchical rules; and wherein the plurality of hierarchical rules determines the demand category associated with each PIN based on the customer segment assigned to each PIN; instructions that cause the one or more processors to identify, based on the historical flight data, a product market defined by historical itineraries having a plurality of departure times and a plurality of aircraft cabin classifications; instructions that cause the one or more processors to identify a demand for the product market by each demand category based on the second table, the historical flight data, and the product market; instructions that cause the one or more processors to represent, using a utility function for each demand category, the demand for the product market; and instructions that cause the one or more processors to use the utility functions in a variable pricing strategy for the product market. In an example embodiment, wherein the instructions that cause the one or more processors to assign each PIN with a customer segment from a plurality of customer segments includes instructions that cause the one or more processors to execute logic code; and wherein the plurality of instructions further includes instructions that cause the one or more processors to change the plurality of hierarchical rules and/or the plurality of priority identifiers to alter the association of the demand categories to the PINs, without requiring a change in the logic code, thereby increasing flexibility in the table-driven data storage system. In an example embodiment, each of the utility functions includes a price variable; and wherein the instructions that cause the one or more processors to use the utility functions in a variable pricing strategy for the product market includes instructions that cause the one or more processors to aggregate demand of itineraries across aircraft cabin classification and aggregate demand of itineraries across departure times. In an example embodiment, the historical itineraries forming the product market either: have an identical initial origination location and an identical final destination location, or are non-stop travel legs between an identical origination location and an identical destination location. In an example embodiment, the historical itineraries forming the product market have non-stop travel legs between an identical origination location and an identical destination location; wherein a first itinerary of the historical itineraries has a first departure time from the identical origination location; wherein a second itinerary of the historical itineraries has a second departure time from the identical origination location; and wherein the first departure time is different from the second departure time. In an example embodiment, the historical itineraries forming the product market have non-stop travel legs between an identical origination location and an identical destination location; wherein a first itinerary of the historical itineraries forming the product market has a first cabin classification; wherein a second itinerary of the historical itineraries forming the product market has a second cabin classification; and wherein the first cabin classification is different from the second cabin classification. In an example embodiment, the historical itineraries forming the product market have an identical initial origination location and an identical final destination location; and wherein a first itinerary of the historical itineraries forming the product market has a first departure time from the initial origination location; wherein a second itinerary of the historical itineraries forming the product market has a second departure time from the initial origination location; and wherein the first departure time is different from the second departure time. In an example embodiment, the historical itineraries forming the product market have an identical initial origination location and an identical final destination location; and wherein a first itinerary of the historical itineraries forming the product market has a first cabin classification; wherein a second itinerary of the historical itineraries forming the product market has a second cabin classification; and wherein the first cabin classification is different from the second cabin classification. In an example embodiment, the flight data further includes a number of requested upgrades for each PIN; and wherein the first table further stores a premium propensity rating for each PIN based on the number of requested upgrades for each PIN. In an example embodiment, the plurality of hierarchical rules determines the demand category associated with each PIN further based on the premium propensity rating associated with each PIN.

It is understood that variations may be made in the foregoing without departing from the scope of the present disclosure.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously and/or sequentially. In several example embodiments, the steps, processes and/or procedures may be merged into one or more steps, processes and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are example only and are not limiting, and those skilled in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A method of using a table-driven data storage system in a computer system comprising a memory, a processor, and a display, the method comprising:
   receiving, using the computer system, passenger name record ("PNR") data for a plurality of airline passengers;
      wherein the PNR data comprises a plurality of PNRs; and
      wherein each PNR is associated with a passenger identification number ("PIN") of a passenger and a passenger's historical itinerary;
   receiving, using the computer system, historical ticketing data comprising a fare charged to each passenger for the passenger's historical itinerary;
   receiving, using the computer system, historical flight data comprising an assigned seat for each passenger during the passenger's historical itinerary;
   assigning, based on the PNR data, the historical ticketing data, and the historical flight data, each PIN with a customer segment from a plurality of customer segments; wherein assigning each PIN with a customer segment from the plurality of customer segments comprises executing logic code;
   storing, in a first table of the table-driven data storage system, the customer segment assignment for each PIN;
   associating, using the first table and a plurality of hierarchical rules stored within a second table of the table-driven data storage system, each PIN with a demand category from a plurality of demand categories;
      wherein the second table comprises a plurality of cells forming a plurality of rows and a plurality of columns;
      wherein the plurality of hierarchical rules are stored within the plurality of cells;
      wherein each rule is associated with one row;
      wherein a plurality of priority identifiers are stored within the plurality of cells; wherein the priority identifiers are associated with one column;
      wherein each priority identifier is also associated with one hierarchical rule to rank the plurality of hierarchical rules; and
      wherein the plurality of hierarchical rules determines the demand category associated with each PIN based on the customer segment assigned to each PIN;
   identifying, using the computer system and based on the historical flight data, a product market defined by historical itineraries having a plurality of departure times and a plurality of aircraft cabin classifications;
   identifying a demand for the product market for each demand category using the computer system and based on the demand category associated with each PIN, the historical flight data, and the product market;
   representing, using a utility function for each demand category, the demand for the product market for each demand category;
   using the utility functions in a variable pricing strategy for the product market;
   changing one of the plurality of hierarchical rules of the second table or one of the plurality of priority identifiers of the second table to alter the association of the plurality of demand categories to the PINs, without requiring a change in the logic code; and altering the plurality of demand categories of the second table without requiring a change in the logic code.

2. The method of claim 1, wherein altering the plurality of demand categories of the second table without requiring a change in the logic code and changing one of the plurality of hierarchical rules or one of the plurality of priority identifiers to alter the association of the demand categories to the PINs without requiring a change in the logic code, increases flexibility in the table-driven data storage system.

3. The method of claim 1, wherein each of the utility functions comprises a price variable; and wherein using the utility functions in the variable pricing strategy for the product market comprises aggregating demand of itineraries across aircraft cabin classification and aggregating demand of itineraries across departure times.

4. The method of claim 1, wherein the historical itineraries forming the product market: have an identical initial origination location and an identical final destination location; and/or are non-stop travel legs between an identical origination location and an identical destination location.

5. The method of claim 4, wherein the historical itineraries forming the product market have non-stop travel legs between an identical origination location and an identical destination location;
wherein a first itinerary of the historical itineraries has a first departure time from the identical origination location;
wherein a second itinerary of the historical itineraries has a second departure time from the identical origination location; and
wherein the first departure time is different from the second departure time.

6. The method of claim 4, wherein the historical itineraries forming the product market have non-stop travel legs between an identical origination location and an identical destination location;
wherein a first itinerary of the historical itineraries forming the product market has a first cabin classification;
wherein a second itinerary of the historical itineraries forming the product market has a second cabin classification; and
wherein the first cabin classification is different from the second cabin classification.

7. The method of claim 4, wherein the historical itineraries forming the product market have an identical initial origination location and an identical final destination location;
wherein a first itinerary of the historical itineraries forming the product market has a first departure time from the initial origination location;
wherein a second itinerary of the historical itineraries forming the product market has a second departure time from the initial origination location; and
wherein the first departure time is different from the second departure time.

8. The method of claim 4, wherein the historical itineraries forming the product market have an identical initial origination location and an identical final destination location;
wherein a first itinerary of the historical itineraries forming the product market has a first cabin classification;
wherein a second itinerary of the historical itineraries forming the product market has a second cabin classification; and
wherein the first cabin classification is different from the second cabin classification.

9. The method of claim 1, wherein the historical flight data further comprises a number of requested upgrades for each PIN; and wherein the first table further stores a premium propensity rating for each PIN based on the number of requested upgrades for each PIN.

10. The method of claim 9, wherein the plurality of hierarchical rules determines the demand category associated with each PIN further based on the premium propensity rating associated with each PIN.

11. An apparatus comprising:
a non-transitory computer readable medium; and
a plurality of instructions stored on the non-transitory computer readable medium and executable by one or more processors, the plurality of instructions comprising:
instructions that cause the one or more processors to receive passenger name record ("PNR") data for a plurality of airline passengers;
wherein the PNR data comprises a plurality of PNRs; and
wherein each PNR is associated with a passenger identification number ("PIN") of a passenger and a passenger's historical itinerary;
instructions that cause the one or more processors to receive historical ticketing data comprising a fare charged to each passenger for the passenger's historical itinerary;
instructions that cause the one or more processors to receive historical flight data comprising an assigned seat for each passenger during the passenger's historical itinerary;
instructions that cause the one or more processors to assign, based on the PNR data, the historical ticketing data, and the historical flight data, each PIN with a customer segment from a plurality of customer segments;
wherein the instructions that cause the one or more processors to assign each PIN with a customer segment from the plurality of customer segments comprise instructions that cause the one or more processors to execute logic code;
instructions that cause the one or more processors to store in a first table, the customer segment assignment for each PIN;
instructions that cause the one or more processors to associate, using the first table and a plurality of hierarchical rules stored within a second table, each PIN with a demand category from a plurality of demand categories;
wherein the second table comprises a plurality of cells forming a plurality of rows and a plurality of columns;
wherein the plurality of hierarchical rules are stored within the plurality of cells; wherein each rule is associated with one row;
wherein a plurality of priority identifiers are stored within the plurality of cells; wherein the priority identifiers are associated with one column;
wherein each priority identifier is also associated with one hierarchical rule to rank the plurality of hierarchical rules; and wherein the plurality of hierarchical rules determines the demand category associated with each PIN based on the customer segment assigned to each PIN;
instructions that cause the one or more processors to identify, based on the historical flight data, a product market defined by historical itineraries having a plurality of departure times and a plurality of aircraft cabin classifications;
instructions that cause the one or more processors to identify a demand for the product market for each demand category based on the demand category associated with each PIN, the historical flight data, and the product market;
instructions that cause the one or more processors to represent, using a utility function for each demand category, the demand for the product market;
instructions that cause the one or more processors to use the utility functions in a variable pricing strategy for the product market;
instructions that cause the one or more processors to change one of the plurality of hierarchical rules of the second table or one of the plurality of priority identifiers of the second table to alter the association of the plurality of demand categories to the PINs, without requiring a change in the logic code; and
instructions that cause the one or more processors to alter the plurality of demand categories of the second table without requiring a change in the logic code.

12. The apparatus of claim 11,
wherein the instructions that cause the one or more processors to alter the plurality of demand categories of the second table without requiring a change in the logic code and to change one of the plurality of hierarchical rules or one of the plurality of priority identifiers to alter the association of the demand categories to the PINs without requiring a change in the logic code increases flexibility of the apparatus.

13. The apparatus of claim 11, wherein each of the utility functions comprises a price variable; and wherein the instructions that cause the one or more processors to use the utility functions in a variable pricing strategy for the product market comprises instructions that cause the one or more processors to aggregate demand of itineraries across aircraft cabin classification and aggregate demand of itineraries across departure times.

14. The apparatus of claim 11, wherein the historical itineraries forming the product market either: have an identical initial origination location and an identical final destination location, or are non-stop travel legs between an identical origination location and an identical destination location.

15. The apparatus of claim 14,
wherein the historical itineraries forming the product market have non-stop travel legs between an identical origination location and an identical destination location;
wherein a first itinerary of the historical itineraries has a first departure time from the identical origination location;
wherein a second itinerary of the historical itineraries has a second departure time from the identical origination location; and
wherein the first departure time is different from the second departure time.

16. The apparatus of claim 14,
wherein the historical itineraries forming the product market have non-stop travel legs between an identical origination location and an identical destination location;
wherein a first itinerary of the historical itineraries forming the product market has a first cabin classification;
wherein a second itinerary of the historical itineraries forming the product market has a second cabin classification; and
wherein the first cabin classification is different from the second cabin classification.

17. The apparatus of claim 14,
wherein the historical itineraries forming the product market have an identical initial origination location and an identical final destination location;
wherein a first itinerary of the historical itineraries forming the product market has a first departure time from the initial origination location;
wherein a second itinerary of the historical itineraries forming the product market has a second departure time from the initial origination location; and
wherein the first departure time is different from the second departure time.

18. The apparatus of claim 14,
wherein the historical itineraries forming the product market have an identical initial origination location and an identical final destination location;
wherein a first itinerary of the historical itineraries forming the product market has a first cabin classification;
wherein a second itinerary of the historical itineraries forming the product market has a second cabin classification; and
wherein the first cabin classification is different from the second cabin classification.

19. The apparatus of claim 11, wherein the historical flight data further comprises a number of requested upgrades for each PIN; and wherein the first table further stores a premium propensity rating for each PIN based on the number of requested upgrades for each PIN.

20. The apparatus of claim 11, wherein the plurality of hierarchical rules determines the demand category associated with each PIN further based on the premium propensity rating associated with each PIN.

* * * * *